US008520595B2

(12) United States Patent
Yadav et al.

(10) Patent No.: US 8,520,595 B2
(45) Date of Patent: Aug. 27, 2013

(54) ROUTING TO THE ACCESS LAYER TO SUPPORT MOBILITY OF INTERNET PROTOCOL DEVICES

(75) Inventors: Navindra Yadav, Cupertino, CA (US); Bhanu Gopalasetty, San Jose, CA (US); Patrice Calhoun, Pleasanton, CA (US); Abhijit Choudhury, Cupertino, CA (US); Rohit Suri, Fremont, CA (US); Sudhir Jain, Fremont, CA (US); Fusun Ertemalp, Palo Alto, CA (US); Kent Leung, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 421 days.

(21) Appl. No.: 12/773,355

(22) Filed: May 4, 2010

(65) Prior Publication Data
US 2011/0274035 A1 Nov. 10, 2011

(51) Int. Cl.
*H04W 40/00* (2009.01)
(52) U.S. Cl.
USPC .......... 370/328; 370/329; 370/338; 370/252; 455/436; 455/411
(58) Field of Classification Search
USPC ......... 370/328, 331, 329, 338, 252; 455/436, 455/411
See application file for complete search history.

(56) References Cited

U.S. PATENT DOCUMENTS

| 5,758,281 | A | 5/1998 | Emery et al. |
| 6,490,259 | B1 | 12/2002 | Agrawal et al. |
| 6,654,359 | B1 | 11/2003 | La Porta et al. |
| 6,961,774 | B1 * | 11/2005 | Shannon et al. ............... 709/227 |
| 6,970,459 | B1 | 11/2005 | Meier |
| 7,061,896 | B2 | 6/2006 | Jabbari et al. |
| 7,577,996 | B1 * | 8/2009 | Merchant et al. ................ 726/26 |
| 7,596,376 | B2 * | 9/2009 | Calhoun et al. ............... 455/436 |
| 7,639,648 | B2 * | 12/2009 | Nagarajan et al. ............ 370/331 |
| 7,826,392 | B2 * | 11/2010 | Ishikawa et al. ............... 370/254 |

(Continued)

FOREIGN PATENT DOCUMENTS
WO 2010053624 A1 5/2010

OTHER PUBLICATIONS

Prommak C. et al., "Next Generation Wireless LAN System Design", Military Communications Conference, MILCOM 2002, Proceedings, Anaheim, CA, Oct. 7-10, 2002, NY, NY, US, vol. 1, Oct. 7, 2002, pp. 473-477.

(Continued)

*Primary Examiner* — Rasheed Gidado
(74) *Attorney, Agent, or Firm* — Edell, Shapiro & Finnan, LLC

(57) ABSTRACT

Techniques are provided for seamless integration of wired and wireless functionality packet forwarding in network. A plurality of access switches are provided in each of a plurality of mobility sub-domains that are part of a mobility domain of a network. Each access switch serves one or more Internet Protocol (IP) subnets, each comprising a plurality of IP addresses. An access switch obtains an IP address for a wireless device according to the one or more IP subnets that the access switch serves. The access switch sends an association advertisement message to indicate the IP address of the wireless device and to enable other access switches and routers to compute a path to the wireless device. When a wireless device obtains an IP address, it can keep the same IP address as it roams in the mobility domain.

20 Claims, 10 Drawing Sheets

(56) References Cited

U.S. PATENT DOCUMENTS

| | | |
|---|---|---|
| 2002/0085719 A1 | 7/2002 | Crosbie |
| 2004/0024908 A1* | 2/2004 | Valdevit et al. ............... 709/248 |
| 2004/0221042 A1 | 11/2004 | Meier |
| 2004/0252653 A1 | 12/2004 | Shimizu et al. |
| 2005/0036471 A1 | 2/2005 | Singh et al. |
| 2005/0165953 A1 | 7/2005 | Oba et al. |
| 2006/0187878 A1 | 8/2006 | Calhoun et al. |
| 2006/0240825 A1 | 10/2006 | Funabiki et al. |
| 2006/0245393 A1* | 11/2006 | Bajic ............................. 370/331 |
| 2006/0245404 A1 | 11/2006 | Bajic |
| 2007/0070959 A1 | 3/2007 | Almeroth et al. |
| 2007/0140163 A1 | 6/2007 | Meier et al. |
| 2007/0147300 A1* | 6/2007 | Jee et al. ....................... 370/331 |
| 2007/0160008 A1 | 7/2007 | Burgess |
| 2007/0160017 A1 | 7/2007 | Meier et al. |
| 2008/0002607 A1 | 1/2008 | Nagarajan et al. |
| 2008/0002642 A1* | 1/2008 | Borkar et al. ................. 370/338 |
| 2008/0043665 A1 | 2/2008 | Jeon et al. |
| 2008/0107070 A1 | 5/2008 | Sastry |
| 2008/0130598 A1 | 6/2008 | Kalhan |
| 2008/0175201 A1 | 7/2008 | Ahmavaara et al. |
| 2009/0059924 A1 | 3/2009 | Muramoto et al. |
| 2009/0093232 A1 | 4/2009 | Gupta et al. |
| 2009/0161590 A1 | 6/2009 | Lewis et al. |
| 2010/0172293 A1 | 7/2010 | Toth et al. |
| 2010/0232306 A1 | 9/2010 | Jeon et al. |
| 2010/0290398 A1 | 11/2010 | Choudhary et al. |

OTHER PUBLICATIONS

International Search Report and Written Opinion in PCT/US2011/034883 dated Jul. 4, 2011.

Johnson et al., "Mobility Support in IPv6", Network Working Group, RFC 3775, Jun. 2004, pp. 1-143.

Narten et al., "Neighbor Discovery for IP Version 6 (IPv6)", Network Working Group, RFC 4861, Sep. 2007, pp. 1-84.

\* cited by examiner

Station roams to another
access switch in same
mobility sub-domain

Station that originally attached and associated to access switch in mobility sub-domain 1 has moved to mobility sub-domain 2, and then moves to mobility sub-domain 3.

ROUTING TO THE ACCESS LAYER TO SUPPORT MOBILITY OF INTERNET PROTOCOL DEVICES

RELATED APPLICATIONS

This application is related to the following commonly assigned co-pending U.S. patent applications filed on May 4, 2010:

U.S. patent application Ser. No. 12/773,351, entitled "Maintaining Point Of Presence At Access Switch For Roaming Clients In Distributed Wireless Controller System."

U.S. patent application Ser. No. 12/773,360, entitled "Maintaining Point Of Presence At Tunneling Endpoint For Roaming Clients In Distributed Wireless Controller System."

TECHNICAL FIELD

The present disclosure relates to networking techniques capable of supporting mobility of a network device.

BACKGROUND

Networked services to wired and wireless devices are supported by equipment that makes up what may be referred to as the "infrastructure" of the network. Examples of equipment in the network infrastructure include routers, access switches and control computers or servers that are used to store data pertaining to the status of devices that connect to the network. Some access switches have routing capabilities and in this regard are also referred to as "forwarders" because they forward packets from one access switch to another.

A device with networking capability, referred to herein as a "client device" or "station", may connect to the network at one access switch and then physically move, i.e., roam, such that it connects to a different access switch in the network. This roaming capability is prevalent with client devices that have wireless capabilities and can connect to a wired network at a different access switch by establishing a wireless connection, such as a wireless local area network (WLAN) connection with a wireless access point (AP) device. Thus, an access switch serves client devices with wired connectivity as well as those with wireless connectivity. A client device may roam from one access switch in the network to another access switch and one important feature of the network infrastructure is accommodating the mobility of wireless client devices.

DESCRIPTION OF EXAMPLE EMBODIMENTS

Overview

Techniques are provided for seamless integration of wired and wireless functionality packet forwarding in network. A plurality of access switches are provided in each of a plurality of mobility sub-domains that are part of a mobility domain of a network. Each access switch serves one or more Internet Protocol (IP) subnets, each comprising a plurality of IP addresses. An access switch obtains an IP address (through any of a variety of means) for a wireless device according to the one or more IP subnets that the access switch serves. The access switch sends an association advertisement message to indicate the IP address of the wireless device and to enable other access switches and routers to compute a path to the wireless device. Using these techniques, a wireless device (station) can move about in the network and keep the IP address in a manner that is completely transparent to the station. This enables the station to maintain any ongoing IP sessions for that IP address as it roams about the network.

EXAMPLE EMBODIMENTS

Figure 1:
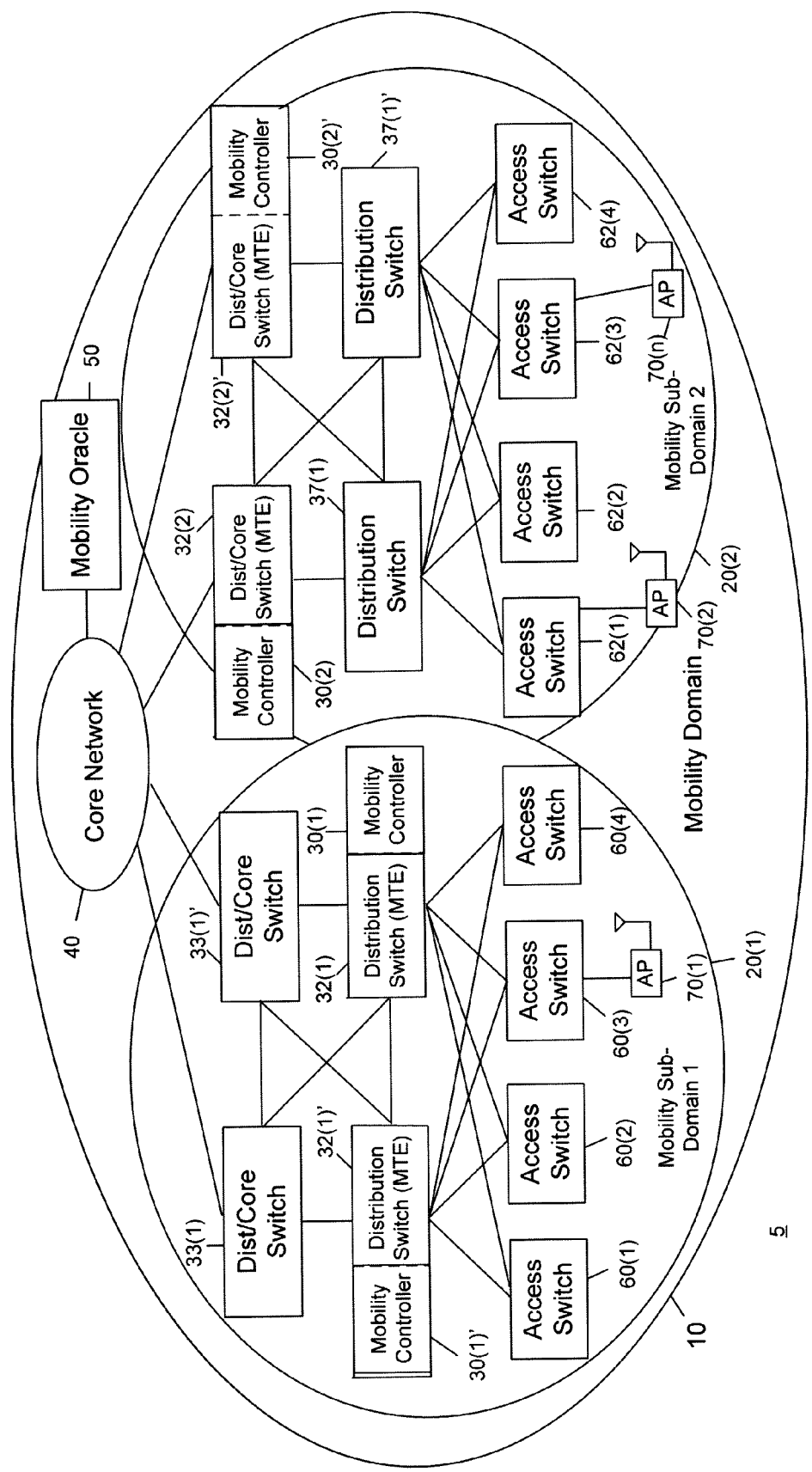
FIG. 1 is an example of a diagram of a network infrastructure architecture.

Reference is first made to FIG. 1. FIG. 1 illustrates a diagram depicting a network infrastructure architecture that is configured to support mobility of wireless client devices. The network architecture 5 comprises a mobility domain shown at reference numeral 10. A mobility domain is a geographical region for which roaming services are to be provided. Contiguous coverage is intended to be provided in this geographical region by the network architecture 5. The network architecture 5 provides better scaling properties over existing systems in that it breaks down the traditional mobility group into multiple mobility sub-domains. Thus, a mobility domain includes one or more mobility sub-domains. For simplicity, FIG. 1 shows two sub-domains 20(1) and 20(2) and labeled Mobility Sub-Domain 1 and Mobility Sub-Domain 2, respectively. For instance, a mobility sub-domain could consist of a single building within a campus. A mobility sub-domain is more of a representation of the network topology than the physical walls of a building, so it is also possible for a sub-domain to span multiple buildings in a campus, for example.

The network architecture 5 further comprises a mobility controller and a mobility oracle. In one form, each mobility sub-domain includes one or more mobility controllers (MCs) and mobility tunnel endpoint (MTE) pairs. While more than a single MC-MTE pair may be present in a sub-domain, only one may be active at any given time. The presence of multiple pairs in a sub-domain is for resilience and failure back up. In another form, a single MC is provided for the entire mobility domain.

FIG. 1 shows that in mobility sub-domain 20(1) there is a mobility controller 30(1) paired with an MTE 32(1) and a backup mobility controller 30(1)' paired with a backup MTE 32(1)'. Similarly, in mobility sub-domain 20(2) there is a mobility controller 30(2) paired with an MTE 32(2) and a backup mobility controller 30(2)' paired with a backup MTE 32(2)'.

In the example architecture shown in FIG. 1, the functions of the MTEs in each sub-domain may be incorporated or integrated with other network equipment. For example, in sub-domain 20(1), the MTEs 32(1) and 32(1)' may be incorporated into a distribution switch and further connected to distribution/core switches 33(1) and 33(1)', respectively. The distribution/core switches 33(1) and 33(1)' are in turn connected to a core network 40 that represents a Layer 3 or "core" portion of the network architecture 5. In mobility sub-domain 20(2), the MTEs 32(2) and 32(2)' may be integrated into respective distribution/core switches that are in turn connected to the core network 40. In this case, there are distribution switches 37(1) and 37(1)' connected to MTEs 32(2) and 32(2)' in sub-domain 20(2).

A mobility controller provides the mobility control plane operations, facilitating handoff events that occur both within a mobility sub-domain, as well as across sub-domains. To this end, an entity called the mobility oracle 50 is provided. The mobility oracle 50 is a centralized database that includes information on each of the client devices in the network, their home mobility sub-domain and the current foreign sub-domain providing service. The mobility oracle 50 is consulted by the individual mobility controllers in order to facilitate inter sub-domain mobility events. The mobility oracle 50 is shown coupled to the core network 40, but it may also be connected at the sub-domain level to any of the mobility sub-domains. As with the mobility sub-domain's mobility controller, more than one mobility oracle may be deployed for redundancy purposes, although only one would be active at any given time for the mobility domain.

Within each mobility sub-domain are access switches that provide the access layer connectivity to client devices operating in the mobility domain 10. For example, mobility sub-domain 20(1) has access switches 60(1)-60(4) and mobility sub-domain 20(2) has access switches 62(1)-62(4).

Each access switch is capable of serving one or more IP subnets. An IP subnet comprises a plurality of IP addresses. An IP address for a client device can be assigned by a DHCP server, it can be statically configured on the client device or the client device can auto generate the IP address from a subnet served by its home access switch. It is possible that two or more access switches may serve the same IP subnet(s).

A client device obtains an IP address the first time it connects to the network, but it may also obtain another IP address thereafter. For example, an IPv6 client device can obtain a new IP address at any time, and thus can have multiple IP addresses. In general, the client device determines when to obtain an IP address and the access switch obtains a new IP address for the client device using any of these techniques.

Access switches within a mobility sub-domain may be grouped together in what is referred to herein as switch peer groups. A switch peer group is statically configured by the MC, based on static information or information that is dynamically learned. Within a switch peer group, every switch has to have the same view of the membership of the group. A switch peer group does not span mobility sub-domains or routing boundaries. A mobility sub-domain may have one or more switch peer groups.

As explained hereinafter, client devices associate to an access switch, either by a wired network connection or a wireless network connection (through a wireless access point device). FIG. 1 shows wireless access point (AP) devices at reference numerals 70(1)-70(n). The AP devices support the Control and Provisioning of Wireless Access Points (CAPWAP) protocol. As the CAPWAP architecture specifies, the APs perform the physical (PHY) layer and real-time IEEE 802.11 MAC functions, which includes IEEE 802.11 encryption. The AP establishes a tunnel to the access switch to tunnel client devices' wireless traffic.

The APs encrypt all CAPWAP control traffic using the Datagram Transport Layer Security (DTLS) protocol. If the AP supports Cisco TrustSec (CTS) or IEEE 802.1AE (MacSec) encryption, then a link between the switch and the AP may be protected by Layer 2 CTS, in which case both CAPWAP control messages and CAPWAP traffic will get encrypted. If CTS is not supported, then the CAPWAP data traffic is unencrypted.

Each MTE provides mobility services on the data plane, ensuring that a client device's point of presence on the Layer 3 network remains constant across mobility events. An MTE's involvement in a routing scenario for a client device is optional in that the functions of the MTE are only utilized when tunneling is employed, as described in more detail hereinafter in connection with FIGS. 9-11.

FIG. 1 shows the MTE function as being located in either the distribution or the distribution/core switch. The location of the MTE is shown in this way purely for illustrative purposes as it could reside in any number of devices, integrated in switches/routers or in stand-alone appliances. The actual embodiment of the MTE may depend upon the switches, routers and appliances supporting a tunneling process described herein. The MTE can have two different roles depending on the availability of the subnets for the roamed client device at the MTE. If the subnet of the roamed client device is available at the MTE, the MTE could become the point of presence; otherwise the MTE functions as a tunnel switching entity that connects the roamed client device to the point of presence, which could be an access switch. As described further hereinafter in connection with FIG. 9, the MTE may be integrated with a border router in each sub-domain. In general, the MTE is a tunneling endpoint apparatus or device, as explained herein, may be integrated for the MC for that mobility sub-domain.

FIG. 1 shows the MCs and the MTEs as co-located entities. Again, the MC handles the mobility control logic, while the MTE provides the data plane operations. The MC and MTE functions may be encompassed in a single physical entity. When integrated in a single entity, the MC configures its data plane, the MTE function, through a set of application programming interfaces (APIs). Thus, in this configuration, the knowledge gained by the MC about locations of client devices is imparted to the MTE for that same sub-domain. However, when the MC and MTE functions are embodied in separate entities, some additional signaling is necessary between the MC and the MTE. This would require the MC to forward portions of the signaling it had received from an access switch to configure the forwarding tables stored at the MTE. The separation of these functions makes it possible to deploy a network that does not make use of tunneling. Such a network would still require the mobility control plane, provided by the MC, but would not require the functions of the MTE.

When the MC and the MTE for a mobility sub-domain are integrated in a single unit, establishing the tunnel comprises configuring a switching unit (e.g., switch and router unit 47 shown in FIG. 4 described hereinafter) in the single unit to direct traffic for the device in the tunnel to the desired destination (e.g., an access switch in that mobility sub-domain or an MTE in another mobility sub-domain).

Figure 2:
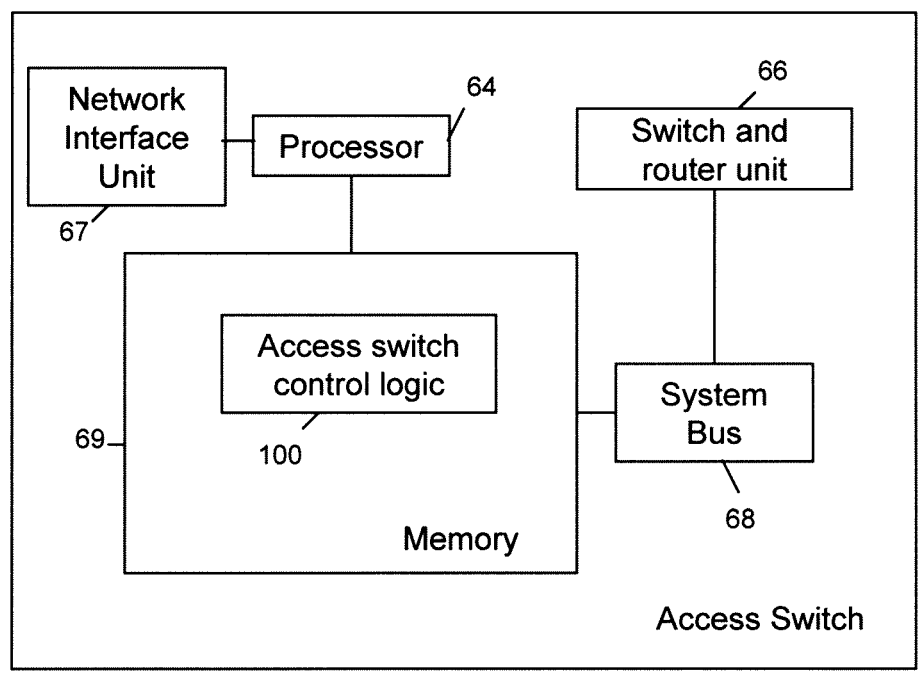
FIG. 2 is an example of a block diagram of an access switch that is part of the network infrastructure architecture shown in FIG. 1.

Reference is now made to FIG. 2 for a description of an example block diagram of an access switch. This diagram is meant to be representative of a block diagram for any of the access switches 60(1)-60(4) and 62(1)-62(4) shown in FIG. 1, and in general for any access switch in any mobility sub-domain. The access switch comprises a processor 64, a switch and router unit 66 that may be in the form of an Application Specific Integrated Circuit (ASIC), a network interface unit 67, a system bus 68 and a memory 70. The switch and router unit 66 provides the packet forwarding (routing) and switching functions that are well known for a network access switch. The network interface unit 67 processes packets for transmission over the network and processes packets received from the network For example, the network interface unit 67 is an Ethernet card or similar device. The access switch is also referred to herein as a "forwarder" because it forwards packets to and from a client device. Instructions for access switch control logic 100 are stored in the memory 69 for execution by the processor 64.

The processor 64 may be a programmable processor or a fixed-logic processor. In the case of a programmable processor, the memory 69 is any type of tangible processor or computer readable memory (e.g., random access, read-only, etc.) that is encoded with or stores instructions that, when executed by the processor 64 or computer or any data processor, cause the processor to perform a variety of functions including the functions of the access switch control logic 100 described herein. Alternatively, the processor 64 may a fixed-logic processing device, such as an ASIC or digital signal processor or a network processor or a general purpose processor, that is configured with firmware comprised of instructions that cause the processor(s) 64 to perform the functions described herein. Thus, instructions for the logic 100 may take any of a variety of forms, so as to be encoded in one or more tangible media for execution, such as with fixed logic or programmable logic (e.g., software/computer instructions executed by a processor) and the processor(s) 64 may be a programmable processor, programmable digital logic (e.g., field programmable gate array) or an ASIC that comprises fixed digital logic, or a combination thereof.

Examples of functions of the access switch control logic 100 are described hereinafter in connection with FIGS. 5-11. These functions include "mobility agent" functions and datapath functions. The mobility agent functions are responsible for handling mobility events on the access switch, configuring the datapath elements on the switch for mobility and communicating with the MC. The datapath functions include terminating the CAPWAP tunnels which encapsulate IEEE 802.11 traffic sourced by wireless client devices, allowing the access switch to treat wired and wireless traffic in a uniform fashion.

More specifically, the functions of the mobility agent in the access switch are as follows. The mobility agent is responsible for responding in a timely manner to mobility control protocol messages sent by the various entities in the network, ensuring that a roaming budget time period is maintained for client devices. If the wireless subnets are not available at the MC/MTE, then the mobility agent assumes the role of the point of presence for roamed client devices that were originally associated with it. When the network is configured in a Layer 2 mode, the mobility agent is responsible for advertising reachability for the client devices connected to it. If tunneling is employed, an Address Resolution Protocol (ARP) request would be transmitted on behalf of the client device through the tunnel, which the point of presence (MTE or access switch) would bridge onto its uplink interface. The mobility agent is responsible for subscribing to multicast groups on behalf of a client device after a roaming event has occurred. This information is passed as part of the context to the new access switch to ensure that the multicast flows follow the client device as it roams. When the access switch is connected to a Layer 3 access network, the mobility agent is responsible for injecting routes for the client devices that are associated with it for which tunneling is not provided. The mobility agent performs an 802.1x authenticator function for both wired and wireless client devices. Finally, when a station successfully authenticates to the network, the mobility agent forwards the Pairwise Master Key (PMK) to the MC, and the MC is responsible for flooding the PMK to all of the access switches in the mobility sub-domain.

Figure 3:
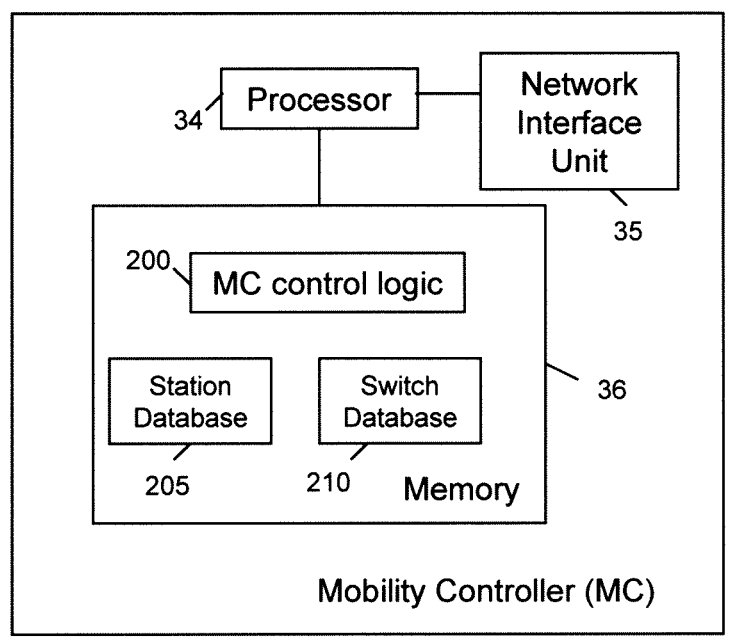
FIG. 3 is an example of a block diagram of mobility controller apparatus that is part of the network infrastructure architecture shown in FIG. 1.

Turning now to FIG. 3, an example block diagram of an MC is now described. An MC is a control apparatus that may be embodied by a computing apparatus comprising a processor 34, a network interface unit 35 and a memory 36. Examples of specific embodiments of the processor 34 and the network interface unit 35 are described above in connection with FIG. 2. The memory 36 stores MC control process logic that, when executed by the processor 34, cause the processor 34 to perform the MC functions described herein. In addition, the memory 36 stores a stations database 205 and a switch database 210.

The stations database 205 maintains a database of all client devices that are being provided service within the local sub-domain or the entire mobility domain. This database may not store full client device context and may only include information indicating whether the client device currently considers the local sub-domain as its home, and is in many ways very similar to the function provided by the mobility oracle, although with a more limited scope, i.e., only for client devices local to the sub-domain. The database may include additional information such as the client device's credentials, which could be in the form of the user's identity, or a common name in a certificate, as well as an IP Address of the device, if one has already been assigned to it by the network.

The switch database 210 maintains a database of all access switches within the mobility sub-domain, and updates all of the access switches, in real-time, as changes to the database occur (e.g., addition or removal of a switch from the network).

Other functions of the MC are summarized as follows. The MC is responsible for responding in a timely manner to mobility control protocol messages from other entities to ensure that the system achieves the desired roaming budget. The MC acts as a gateway between the access switches and the mobility oracle. When the MC does not find a match in its local database, it forwards the request to the mobility oracle, which is responsible for the entire mobility domain. However, there are deployment scenarios, such as the one described hereinafter in connection with FIGS. 9-11, where the MC is responsible for the entire mobility domain. When tunneling is employed for a client device, its point of presence on the network could be the MTE if the wireless subnets are available at the MTE. Therefore, in these cases, the MC will respond to any ARP requests received for the client devices it is responsible for. When the MC is connected to a Layer 3 network, it is responsible for injecting routes into the network for the client devices it provides service for via a tunnel. The MC is the control point for the access switches for all mobility management related requests. When a change in a client device's point of attachment occurs, the MC is responsible for configuring the proper forwarding policy on the MTE, which may be collocated with the MC. If the MC and the MTEs are physically separate, the MC is responsible for initiating the signaling to the MTE to enforce changes in the client device's point of attachment in the network. The MC is capable of handling unsolicited commands from the Remote Authentication Dial-in User Service (RADIUS) infrastructure. These messages can be received by an access switch and forwarded to the MC to clear out or update the client key cache entries. It is also the responsibility of the MC to forward these messages to other MCs in mobility domain if a message is received from access switch. Finally, the MC optionally acts as an Network Time Server to the access switches to allow all access switches within a mobility sub-domain to have their clocks synchronized. The MC in turn synchronizes its clock off the mobility oracle.

Figure 4:
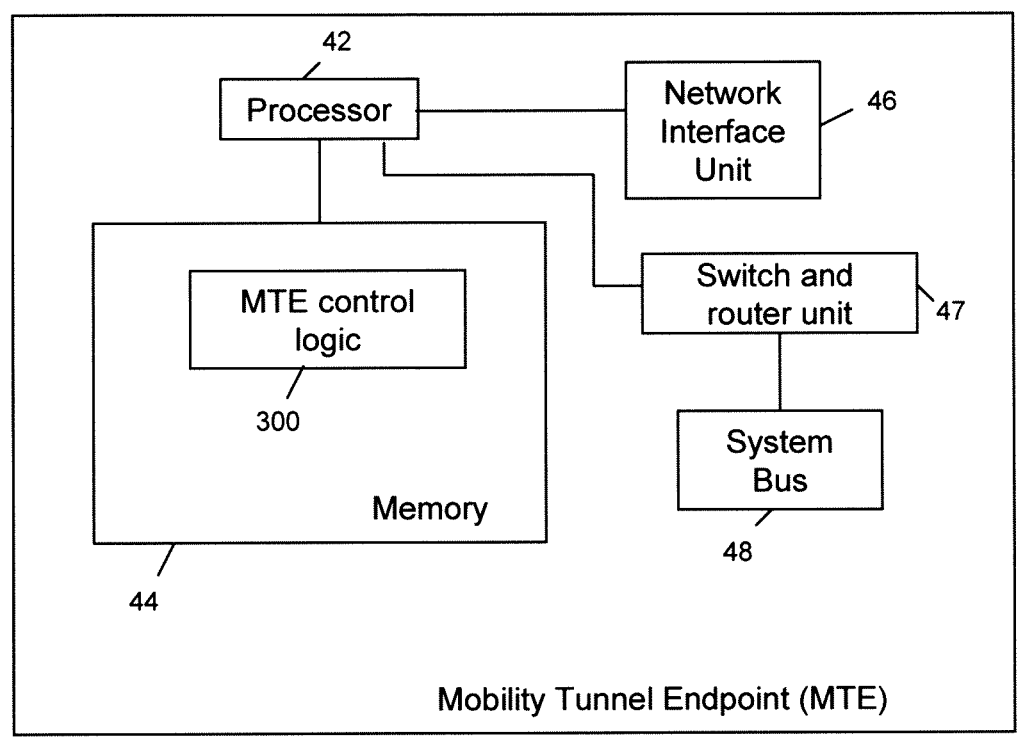
FIG. 4 is an example of a block diagram of a mobility tunnel endpoint (MTE) apparatus that is part of the network infrastructure architecture shown in FIG. 1.

Turning to FIG. 4, an example block diagram of an MTE is now described. The MTE is a computing apparatus that may also perform routing functions. The MTE comprises a processor 42, a memory 44 and a network interface unit 46. The MTE may be integrated into a distribution switch or router and to this end FIG. 4 shows basic switching components including a switch and router unit 47 and a system bus 48. Instructions are stored in the memory 44 for MTE control logic 300. The processor 42 executes the instructions for the MTE control logic 300 to perform the various MTE functions described herein.

The MTE handles the mobility data plane. The role of the MTE is different depending on whether or not it is serving as the point of presence for client devices in the sub-domain. If the wireless subnets are not available at the MTE, then the point of presence for roamed client devices is at the home access switch. In this scenario, the MTE serves as a tunnel switching entity that connects the foreign access switch (point of attachment) to the anchor access switch (point of presence). If the wireless subnets are available at the MTE, then the MTE serves as the point of presence.

The functions of the MTE are generally as follows. The MTE terminates "mobility" tunnels from the access switch. Thus, there are pre-established tunnels between the MTE and each access switch in a given mobility sub-domain. Traffic to and from the roamed client device is sent to the foreign access switch via the mobility tunnel. An MTE-MTE tunnel is used to tunnel traffic between mobility sub-domains. The MTE has an interface the MC uses to configure the MTEs forwarding tables to reflect mobility events. When the MC and MTE are collocated, this is simply an API. If both functions are not collocated, this is a protocol.

As explained herein, the MC and MTE functions may be implemented by separate physical entities. In the case where they are implemented in a single entity, the MTE does not actually act as a router, and therefore does not inject routes into the network. The MC is responsible for advertising routes. However, the interfaces on which the routes are injected are considered part of the MTE. In the unlikely event that the MTE is decoupled from the MC, it is responsible for transmitting certain packets on behalf of the MC. For instance, the MC will provide Proxy ARP and routing services, yet these packets are transmitted on the MTEs interfaces. For networks that do not make use of tunneling, the MTE is not a necessary function.

The following terms are defined for convenience in connection with the descriptions herein.

Foreign Mobility Controller: The MC providing mobility management service for the client device in a foreign mobility sub-domain. The foreign MC acts as a liaison between access switches in the foreign sub-domain and the MC in the home sub-domain.

Foreign Mobility Sub-Domain: The mobility sub-domain, controlled by an MC, supporting a client device which is anchored in (its IP address is part of an IP subnet of) another mobility sub-domain.

Foreign Switch: The access switch in the foreign mobility sub-domain currently providing service to the client device.

Home Mobility Controller: The MC providing the single point of control and mobility management service for client devices in their home mobility sub-domain.

Home Mobility Sub-Domain: The mobility sub-domain, controlled by a MC, for a client device where its IP address was assigned or obtained.

Home Access Switch: The switch in the home mobility sub-domain that last provided service to a client device.

Mobility Domain: A collection of mobility sub-domains across which mobility needs to be supported.

Mobility Sub-Domain: The mobility sub-domain is an autonomous component of the overall mobility domain network. A sub-domain generally connects into the core network, and includes one or more MC functions, and optionally their associated MTEs. A mobility sub-domain is the set of devices managed by the active Mobility Controller. A mobility sub-domain comprises of a set of access switches, and associated APs, across which fast roaming is desired. A mobility sub-domain is equivalent to an 802.11r key domain. The mobility sub-domain may also be referred to as an IP Everywhere (IPe) sub-domain. A mobility sub-domain and an IP sub-domain are terms that are used interchangeably herein.

Point of Attachment: A client device's point of attachment is where the client is currently associated to the wireless network. This could either be the access switch that is currently providing service to the AP where the client device is associated, or the WLAN controller in the case of a legacy deployment. Thus, a wireless client device may roam from one AP on a first access switch to another AP on a second access switch and thereby become "attached" at or on the second access switch.

Point of Presence: A client device's point of presence is the place in the network where the client device is being advertised. For instance, if a switch is advertising reachability to the client device via a routing protocol, the interface on which the route is being advertised is considered the client device's point of presence.

Station: A client device that connects to and requests service from the network. The device may have a wired, wireless or both interfaces. The term station may be used interchangeably with the term client device.

According to the techniques described herein, routing that would normally be performed at Layer 3 (L3) is pushed to the access layer, that is, to the access switches, without the drawbacks of L3 routing. Traditional routing, if pushed to the access layer, would cause subnet fragmentation. In traditional L3 routing a subnet has to be associated with an L3 interface. By contrast, using the techniques described herein, the subnet is no longer associated with an L3 interface, but rather the IP subnet belongs to the mobility domain, which is an arbitrary collection of switches and routers. Consequently, when a wireless station roams from an AP connected to one access switch to an AP on another access switch, the wireless station does not have to change its IP address, as its IP address is still valid at the new point of attachment.

As explained above, a client device can obtain multiple IP addresses. This is provided for in IPv6, and is possible, but rare with IPv4 (though not illegal). For an IPv4 or IPv6 address, the client device receives the address from the network via a DHCPv4 or DHCPv6 server. These techniques, as described herein, operate for a client device that has a single IP address or multiple IP addresses.

In the case of a statically assigned IP address, the IPeverywhere forwarder (access switch) learns unknown IP addresses. This means whenever an access switch detects attachment of a wireless client device having an unknown IP address (identified by its MAC address), the IPeverywhere forwarder (access switch) follows the same process as when a DHCP server assigns the IP address. Learning of the new IP address provides the trigger to perform the actions described herein so as to enable access switches and routers to compute the path to that wireless client device by computing a path to the access switch that sends the association advertisement message for the IP address for that wireless client device. Whether a client device determines its IP address statically is a security configuration for the mobility domain that can be enabled per forwarder or per interface of the forwarder.

Figure 5:
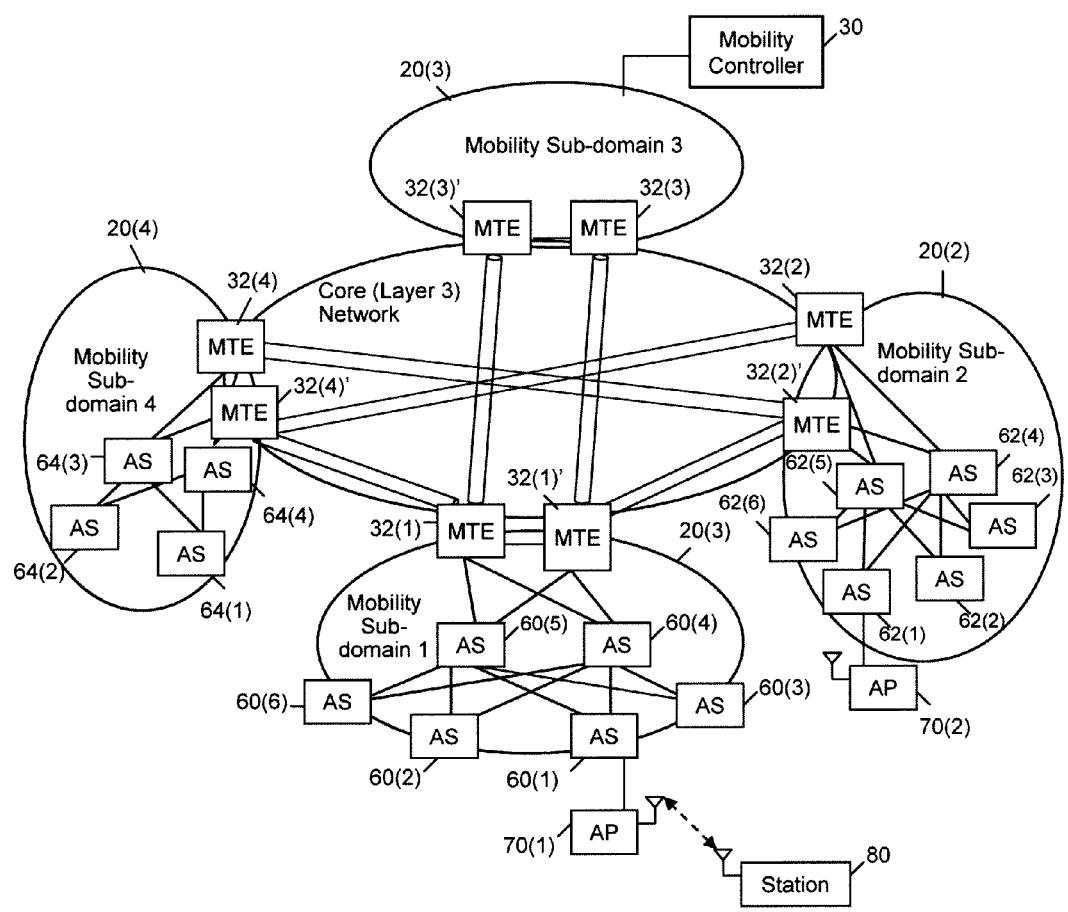
FIG. 5 is an example of a more detailed diagram illustrating a plurality of mobility sub-domains in the network infrastructure architecture.

Reference is now made to FIG. 5 for a description of the network architecture in a particular example in which a station 80 associates with an access switch in a given mobility sub-domain in a mobility domain. FIG. 5 also illustrates an example of a campus network topology comprising, in this example, four mobility sub-domains 20(1)-20(4). Each mobility sub-domain has a pair of MTEs, one of which is redundant, and in this topology, there is a single mobility controller 30 for the entire domain which is attached at mobility sub-domain 20(3). That is, sub-domain 20(1) has MTEs 32(1) and 32(1)', sub-domain 20(2) has MTEs 32(2) and 32(2)', sub-domain 20(3) has MTEs 32(3) and 32(3)' and sub-domain 20(4) has MTEs 32(4) and 32(4)'. In this example, the MTEs may be integrated with border or edge routers of their respective sub-domain. There are pre-established tunnels, shown at reference numerals 90(1)-90(6) between the MTEs. For simplicity, not all of the tunnels are shown in FIG. 5. Also, in this example network topology, there is one MC 30 for the entire mobility domain. FIG. 5 shows that station 80 has wireless interface capability and wirelessly associates with an AP 70(1) that is in turn connected to access switch (AS) 60(1) of sub-domain 20(1). In this way, the station effectively associates to the network at AS 60(1) of sub-domain 20(1). The process by which a station newly associates to the mobility domain is described with reference to FIG. 6, where in this example, the station 80 associates to access switch 60(1) of sub-domain 20(1).

In the foregoing descriptions of the ladder flow diagrams of FIGS. 6, 8, 10 and 11, operations that are labeled with a reference numeral in the 100's are operations performed by access switch control logic 100 of an access switch, operations that are labeled with a reference numeral in the 200's are operations performed by the MC control logic 200 and operations that are labeled with a reference numeral in the 300's are operations performed by the MTE control logic 300. Each access switch is capable of performing the functions described herein for a station that roams from it and for a station that roams to it.

Figure 6:
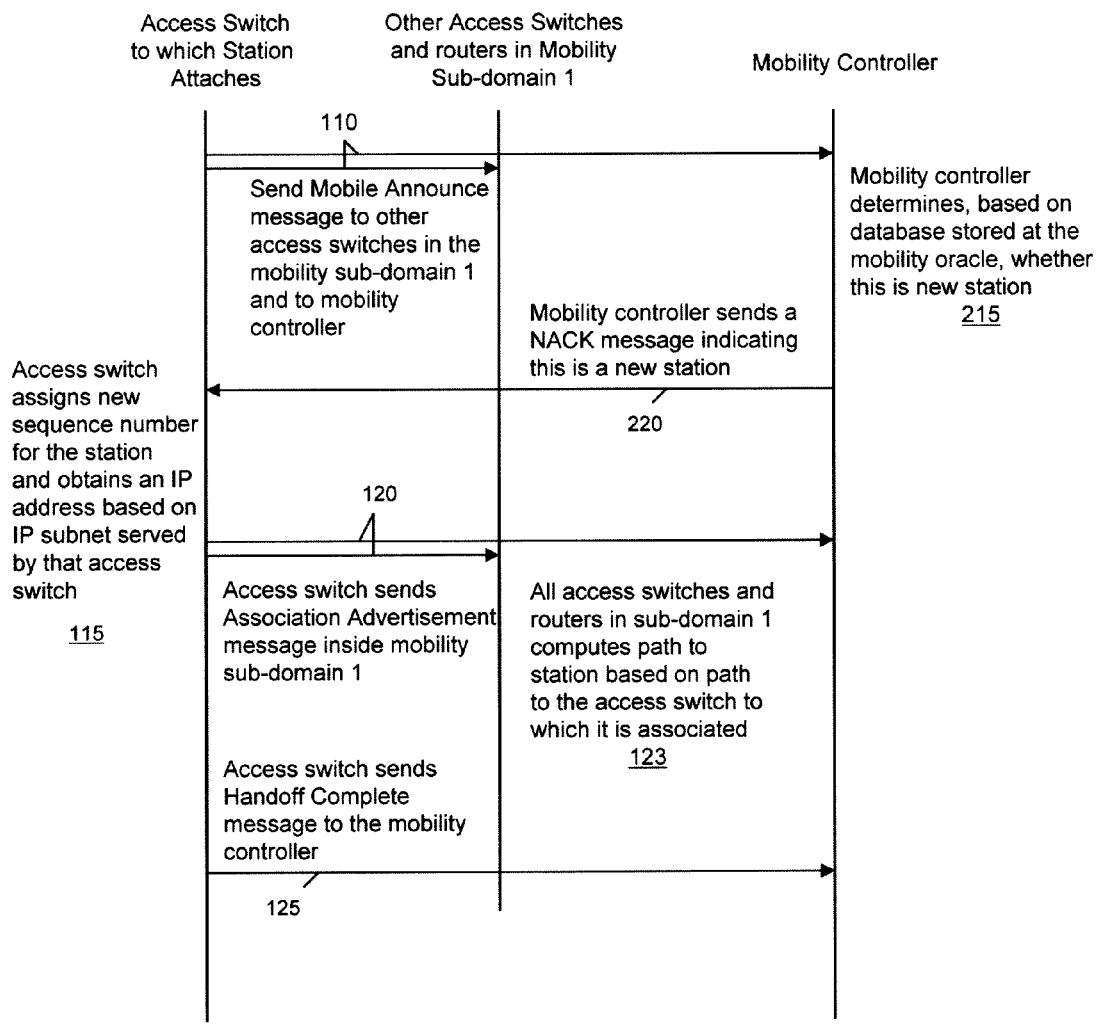
FIG. 6 is an example of a ladder flow diagram depicting the control messages that are sent between equipment in the network infrastructure architecture showed in FIGS. 1 and 2 when a client device obtains a new Internet Protocol (IP) address.

Referring now to FIG. 6, with reference to FIG. 5, the process by which a wireless station newly associates to the mobility domain is described. When wireless station 90 associates to access switch 60(1), the access switch at 110 sends a Mobile Announce message to the other access switches in that access switch's mobility sub-domain and to the mobility controller 30. Thus, access 20(1) sends the Mobile Announce message indicating that it has detected station 80. At 215, the mobility controller 30 determines, based on its stations database, whether the station 80 is a new station that has not already been assigned an IP address. The mobility controller 30 may compare information about the station, such as the device's credentials in the form of a user identity, a common name in a certificate, a medium access control (MAC) address, etc., with the stored data in the stations database.

For purposes of this example, it is assumed that the station 80 is new and therefore the mobility controller at 220 sends a non-acknowledgment (NACK) message back to the access switch that sent the Mobile Announce message, e.g., access switch 20(1).

At 115, the access switch, in response to receiving the NACK message from the mobility controller, assigns a new sequence number (to keep track of how many times that station has moved in the mobility domain) and obtains (from a DHCP server or through the other techniques mentioned above) an IP address for use by the station based on the IP subnet served by that access switch. For example, the IP subnet served by that access switch 60(1) may be "10.1.1.x/24" and the IP address obtained for the station may be "10.1.1.1".

At 120, the access switch sends an Association Advertisement message inside sub-domain 20(1) to all other access switches and routers in sub-domain 20(1). The Association Advertisement message may comprise the IP address of the station 80, the sequence number assigned by the access switch 20(1), the virtual local area network (VLAN) identifier or number, the state and sub-domain identifier for sub-domain 20(1). In other words, the Association Advertisement message is configured to indicate the IP address of the station and the association of the station to the access switch 60(1) in sub-domain 20(1). At this point in the process, all access switches and routers in sub-domain 20(1) compute a path to the station 80 based on the path to access switch 60(1) to which the station associated, as indicated at 123.

At 125, the access switch sends a Handoff Complete message to the mobility controller 30. The Handoff Complete message is configured to indicate the association of the station to the access switch 60(1) that is in the mobility sub-domain 20(1). As a result of this association process, the IP address of a wireless station is tied to an access switch within a mobility sub-domain and therefore has "floating" or "movable" characteristics. The station can move within a mobility sub-domain or to mobility another sub-domain without losing its IP address, which would cause the wireless station to lose any sessions that were occurring for that IP address.

The use of sequence number is optional for some embodiments described herein. Sequence numbers are numbers assigned to an association detection event of a wireless station and are used to track the number of times that the wireless station moves from one access switch to another access switch in the network. The use of Delete messages may be used in place of sequence numbers for certain embodiments, as described herein.

Thus, the procedure depicted in FIGS. 6 and 7 may be summarized as follows. At a first access switch in a first mobility sub-domain of a network comprising a plurality of mobility sub-domains, each mobility sub-domain comprising one or more access switches each serving one or more IP subnets each comprising a plurality of IP addresses, connection of a wireless device to the first access switch is detected. The first access switch sends an announce message from the first access switch to all other access switches in the first mobility sub-domain and to a controller apparatus that is configured to control routing for the plurality of mobility sub-domains, wherein the announce message indicates detection of the wireless device by the first access switch. The first access switch obtains an IP address for the wireless device according to the one or more IP subnets served by the first access switch when the wireless device connects to the network or otherwise is called upon by the client device to provide a new IP address (even if the IP address already has one or more IP addresses). The first access switch sends an association advertisement message to other access switches and routers in the first mobility sub-domain, wherein the association advertisement message is configured to indicate the IP address of the wireless device and the association of the device to the first access switch to enable other access switches and routers in the first mobility sub-domain to compute a path to the wireless device for that IP address obtained by the first access switch by computing a path to the first access switch.

Similarly, an access switch apparatus is provided that comprises a network interface unit configured to enable communications over a network comprising a plurality of mobility sub-domains each comprising one or more access switches that serves one or more IP subnets that comprises a plurality of IP addresses; a switch and router unit configured to switch and forward packets over the network; and a processor configured to be coupled to the network interface unit and to the switch and router unit. The processor is configured to: store information indicating the one or more IP subnets that are served by the apparatus; detect connection of a wireless device; generate an announce message to be sent to other access switches in a first mobility sub-domain and to a controller apparatus that is configured to control routing for the plurality of mobility sub-domains, wherein the announce message indicates detection of the wireless device; obtain an IP address for the wireless device according to an IP subnet served by the apparatus; and generate an association advertisement message to be sent to other access switches and routers in the first mobility sub-domain, wherein the association advertisement message is configured to indicate the IP address obtained for the wireless device and the association of the wireless device to the access switch apparatus to enable other access switches and routers in the first mobility sub-domain to compute a path to the device by computing a path to the apparatus.

The access switch apparatus summarized above is further configured to detect when a wireless device has roamed and attached to it. To this end, the processor configured to detect connection to the network of "an other" wireless device, that is a wireless device that is not part of an IP subnet that it serves. The processor is configured to generate an announce message to be sent to other access switches in the its (e.g., the first mobility sub-domain) and to the controller apparatus of that mobility sub-domain; receive a message from the controller apparatus indicating that the other wireless device was previously associated with an access switch in a second mobility sub-domain; receive a handoff message from the access switch in the second mobility sub-domain to which the other wireless device was previously attached, the handoff notification message indicating the IP address of the wireless device; generate an association advertisement message to be sent to access switches and routers in the first mobility sub-domain, the association advertisement message indicating the IP address of the other wireless device and the association of the other wireless device to the access switch apparatus to enable access switches and routers in the first mobility sub-domain to compute a path to the other wireless device based on a path to the access switch apparatus; and generate a handoff complete message to be sent to the controller apparatus.

Further still, a tangible processor or computer readable medium encoded with instructions that, when executed by a processor, cause the processor to: at a first access switch in a first mobility sub-domain of a network comprising a plurality of mobility sub-domains, each mobility sub-domain comprising one or more access switches each serving one or more IP subnets each comprising a plurality of IP addresses, detect connection of a wireless device to the first access switch; generate an announce message to be sent from the first access switch to all other access switches in the first mobility sub-domain and to a controller apparatus that is configured to control routing for the plurality of mobility sub-domains, wherein the announce message indicates detection of the wireless device by the first access switch; obtain an IP address for the wireless device according to the one or more IP subnets served by the first access switch; and generate an association advertisement message to be sent from the first access switch to other access switches and routers in the first mobility sub-domain, wherein the association advertisement message is configured to indicate the IP address of the wireless device and the association of the wireless device to the first access switch such that other access switches and routers in the first mobility sub-domain can compute a path to the wireless device by computing a path to the first access switch.

Still further, a system is provided comprising a plurality of access switches in each of a plurality of mobility sub-domains of a network, each access switch serving one or more IP subnets comprising a plurality of IP addresses; and a controller apparatus connected to the plurality of mobility sub-domains and configured to communicate with the access switches in each of the plurality of mobility sub-domains. Each access switch is configured to: send an announce message to all other access switches in its respective mobility sub-domains and to the controller apparatus upon detecting connection of a wireless device; obtain an IP address for the wireless device according to the one or more IP subnets served by the access switch; and send an association advertisement message to other access switches and routers in its respective mobility sub-domain, wherein the association advertisement message is configured to indicate the IP address of the wireless device and the association of the wireless device thereto to enable other access switches and routers in that mobility sub-domain to compute a path to the wireless device by computing a path to the access switch to which the device is associated.

Figure 7:
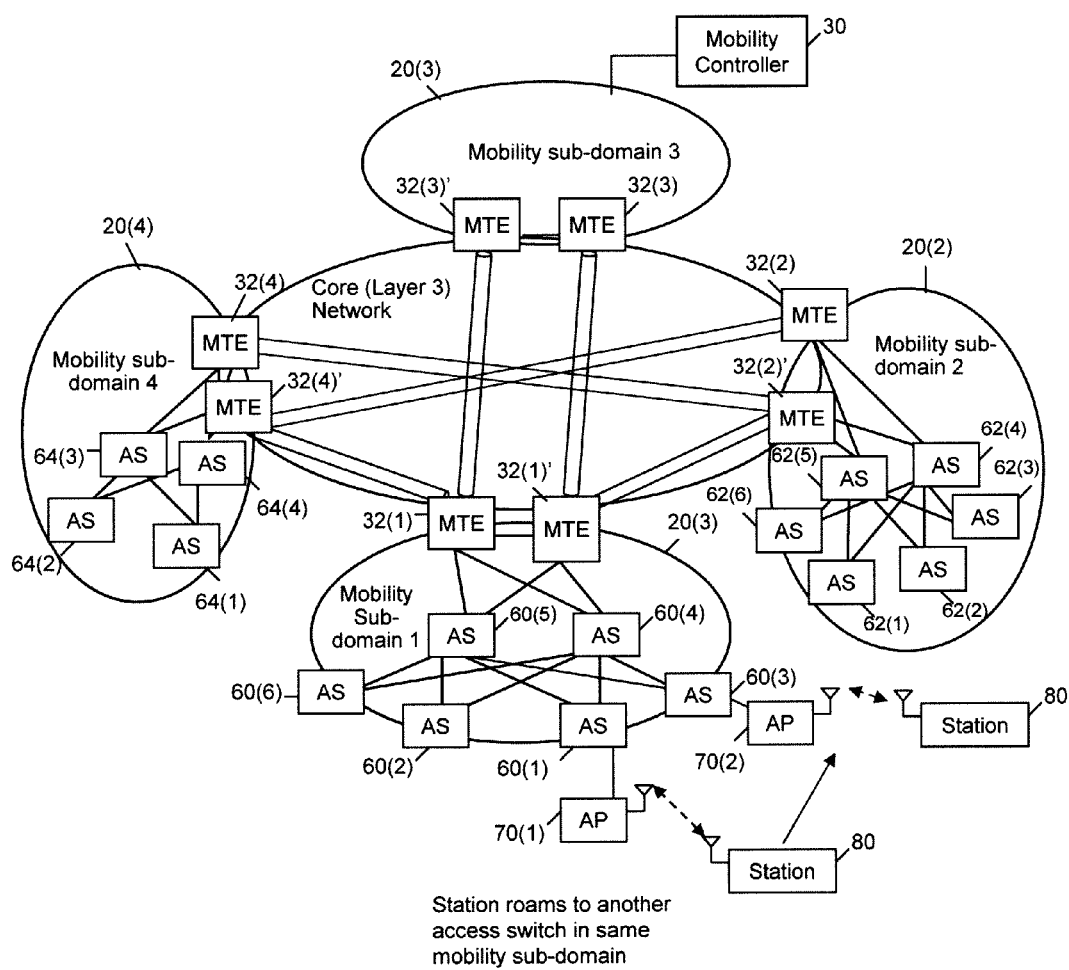
FIG. 7 is an example of a diagram, similar to FIG. 2, which illustrates roaming of a client device within a mobility sub-domain.

Reference is now made to FIG. 7 which shows a wireless station roaming from one access switch to another access switch in the same mobility sub-domain. For example, station 80 roams from access switch 60(1), via AP 70(1), to AP 70(2) on access switch 60(3). This is referred to as intra mobility sub-domain roaming.

Figure 8:
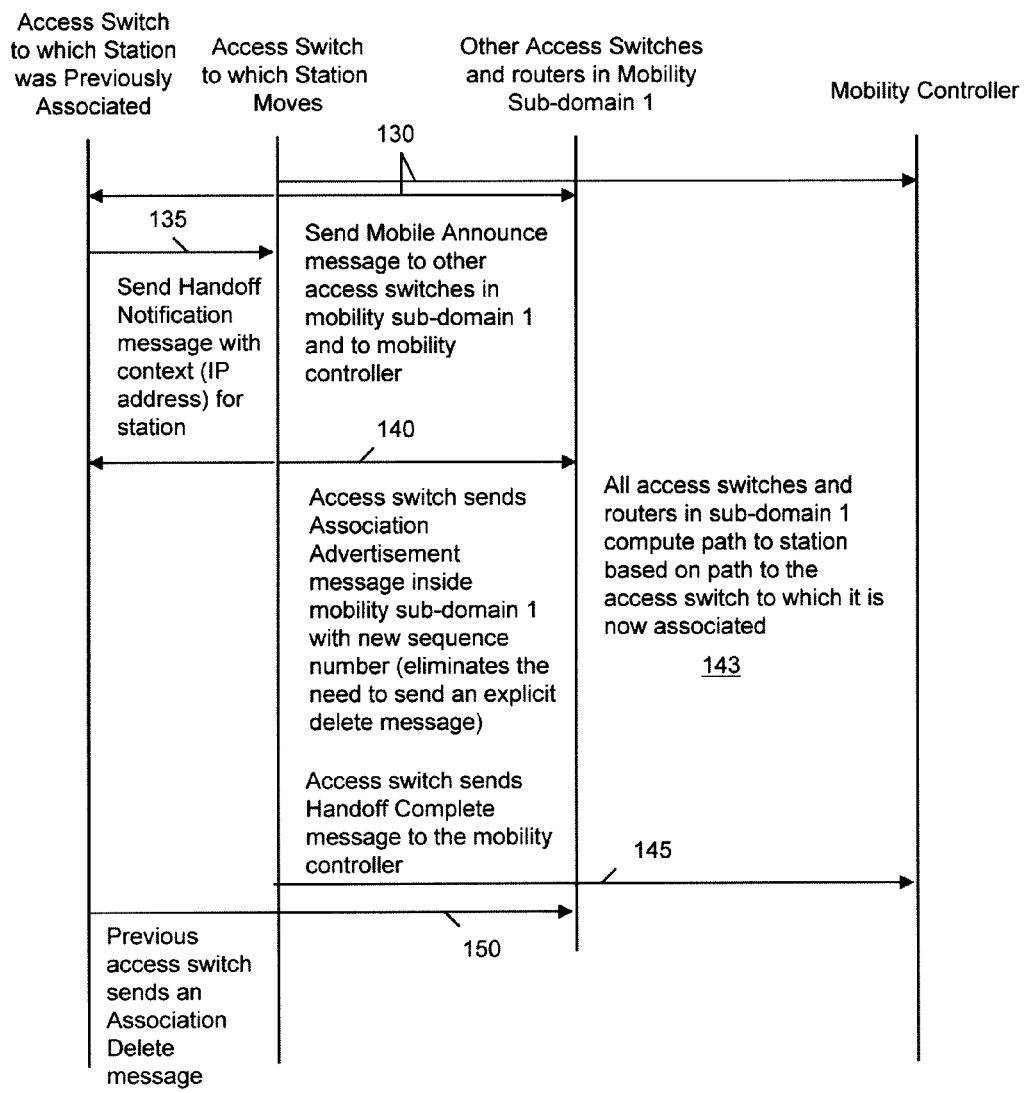
FIG. 8 is an example of a ladder flow diagram depicting the control messages that are sent between equipment in the network for the roaming scenario depicted in FIG. 7.

The ladder flow diagram shown in FIG. 8 is now described in connection with the intra-sub-domain roaming example of FIG. 7. At 130, the access switch to which the wireless station 80 has roamed, e.g., access switch 60(3), also called the "second access switch" in sub-domain 20(1), sends a Mobile Announce message to other access switches in sub-domain 20(1) and to the mobility controller. At 135, the access switch to which the station 80 was previously associated, access switch 60(1) (which is called the "first access switch" in sub-domain 20(1)), receives the Mobile Announce message indicating that the station roamed and has become attached at the second access switch. In response to receiving the Mobile Announce message, the first access switch 60(1) sends a Handoff Notification message for the station to the access switch 60(3). The context that is forwarded by access switch 60(1) includes the IP address of the station 80. At 140, the access switch 60(3) increments the sequence number for the station 80 and sends an Association Advertisement message inside the sub-domain 20(1) with the new sequence number and which Association Advertisement message indicates the attachment and association of the station 80 at the access switch 60(3). The use of the sequence number eliminates the need to send an explicit delete message as described above. At this point, all access switches and routers in mobility sub-domain 20(1) compute a path to station 80 based on a path to access switch 60(3) to which the station 80 is now associated as indicated at 143.

At 145, the access switch to which the station is now associated sends a Handoff Complete message to the mobility controller indicating the attachment and association of the wireless device at the access switch 60(3). At 150, the previous access switch, 60(1), sends an Association Delete message to all other access switches and routers in sub-domain 20(1) that indicates deletion of the association of station 80 to the access switch 60(1). The access switch 60(1) may send the Association Delete message on its own or in response to receiving a valid Mobile Announce message from access switch 60(3). Alternatively, the access switch 60(1) may send an Update message with a specialized sequence number "0xFFFF" that effectively withdraws the old path to access switch 60(1) for the station 80 in the sub-domain 20(1).

Figure 9:
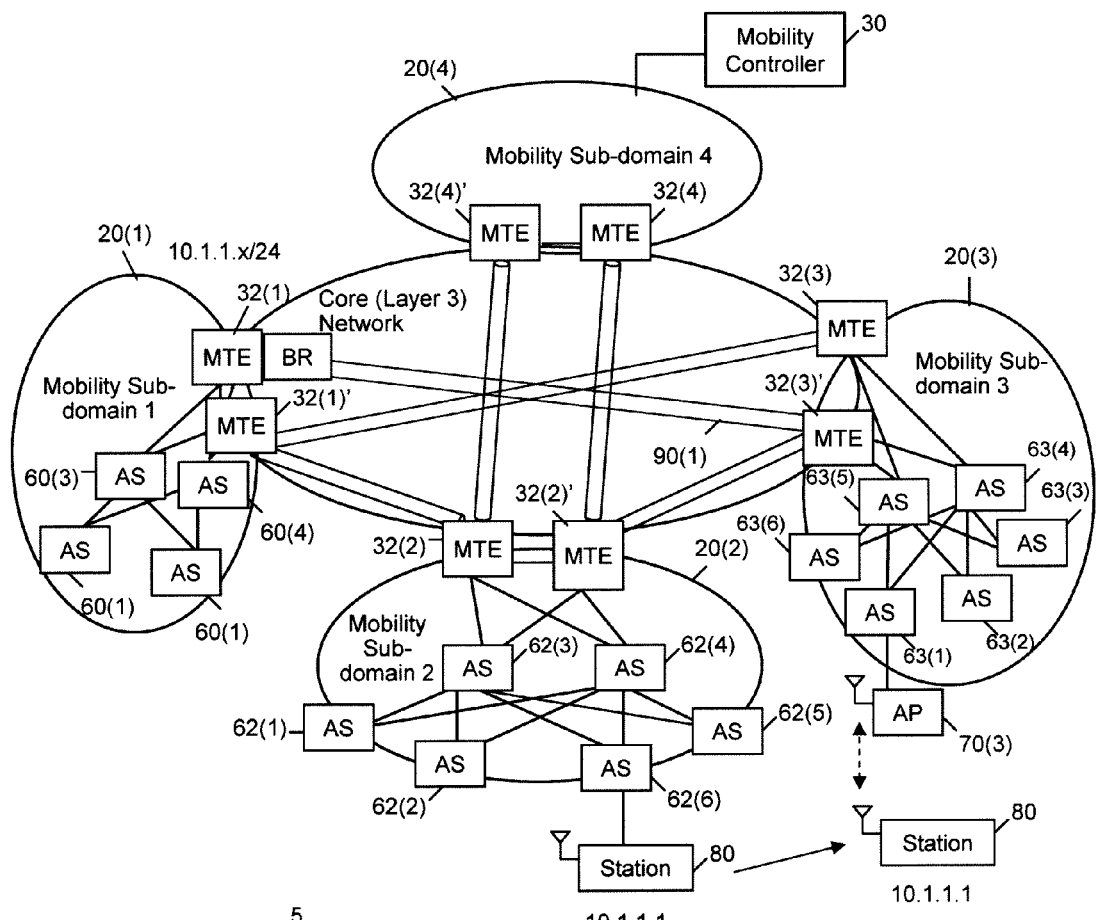
FIG. 9 is an example of a diagram, similar to FIG. 2, which illustrates roaming of a client device between mobility sub-domains.

Reference is now made to FIG. 9 for a description of an inter mobility sub-domain roam by a station. In the example shown in FIG. 9, the wireless station 80, which originally associated at an access switch in sub-domain 20(1), moved to an access switch in sub-domain 20(2). Station 80 is currently associated to access switch 62(6) in sub-domain 20(2). Station 80 then roams and associates to switch 63(1), via AP 70(3), of mobility sub-domain 20(3). When station 80 first associated to the network at an access switch in sub-domain 20(1), that access switch obtained an IP address for the wireless device that is part of the IP subnet that access switch 60(1) served. For example, if an IP subnet served by access switch 60(1) is "10.1.1.x/24", then the IP address for station 80 is, for example, "10.1.1.1" and the station 80 keeps this IP address when it roams across mobility sub-domains. Also in this example, the MTEs for each sub-domain are integrated with a border router (BR) for that sub-domain. Thus, the MTEs for sub-domain 20(1) are denoted MTE/BR 32(1) and 32(1)', the MTEs for sub-domain 20(2) are denoted MTE/BR 32(2) and 32(2)', the MTEs for sub-domain 20(3) are denoted MTE/BR 32(3) and 32(3)', and so on. As explained above, an MTE/BR is also referred to herein as a tunneling endpoint device or apparatus and it may be integrated with the MC for that mobility sub-domain.

Figure 10:
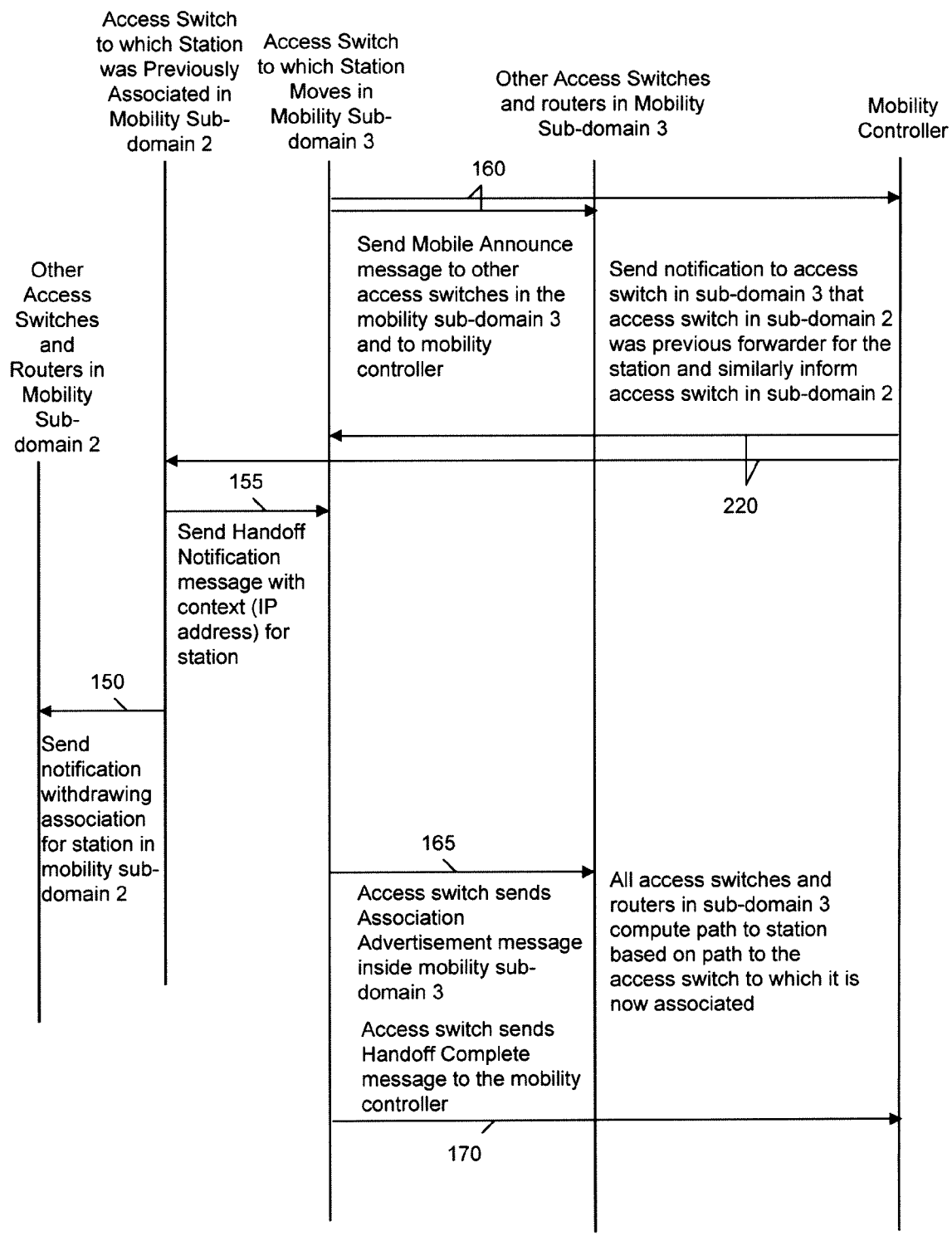
FIGS. 10 and 11 are examples of ladder flow diagrams depicting the control messages that are sent between equipment in the network for the roaming scenarios depicted in FIG. 9.
Figure 11:
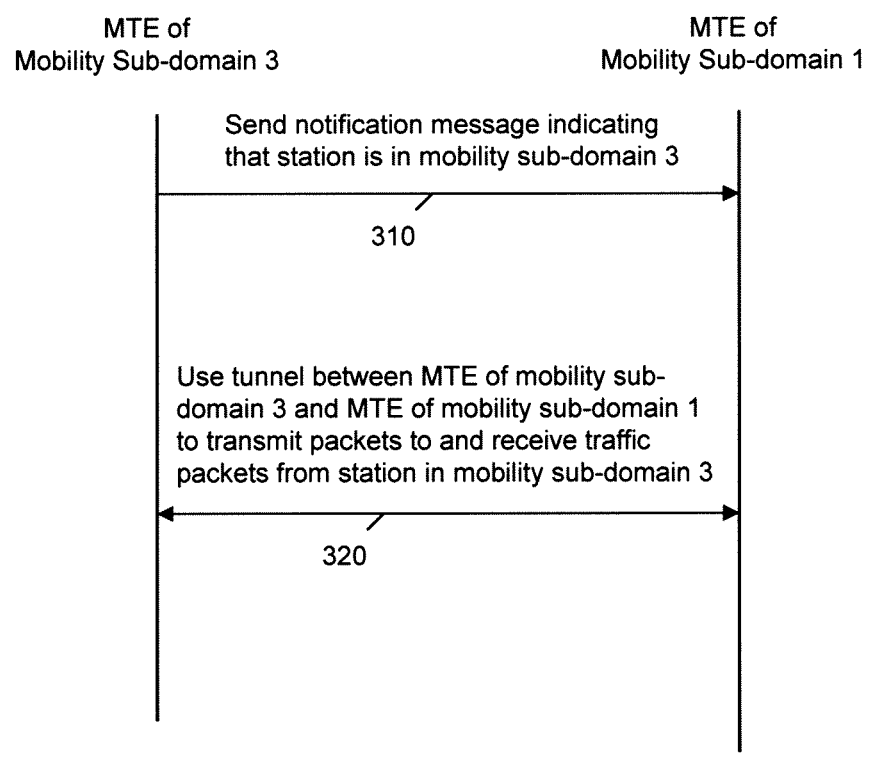

Reference is now made to the ladder flow diagram of FIGS. 10 and 11 to explain the control flow between the various network entities in order to allow the wireless station to maintain its IP address when roaming across mobility sub-domains. At 160, the access switch 63(1) in mobility sub-domain 20(3) sends a Mobile Announce message to other access switches in mobility sub-domain 20(3) and to the mobility controller 30. At 220, the mobility controller, by referring to its station database and switch database, determines that access switch 62(6) was the previous access switch for station 80. Then, the mobility controller sends a notification to access switch 63(1) in sub-domain 20(3) indicating that access switch 62(6) was the previous access switch for the station 80 and similarly informs access switch 62(6) that access switch 63(1) in sub-domain 20(3) is now the access switch for station 80. At 155, access switch 62(6) in sub-domain 20(2) sends a Handoff Notification message with context (IP address) for station 80 to access switch 63(1) in sub-domain 20(3). At 160, access switch 62(6) in sub-domain 20(2) sends a notification withdrawing its association for station 80 in mobility sub-domain 20(2), either by sending an Association Delete message or by sending the aforementioned special sequence number for station 80.

At 165, access switch 63(1) in sub-domain 20(3) sends an Association Advertisement message to all access switches and routers in sub-domain 20(3). The Association Advertisement message may comprise the IP address of the station 80, the sequence number assigned by the access switch 63(1), the VLAN identifier or number, the state and mobility sub-domain identifier for sub-domain 20(3). At this point, all access switches and routers (including MTE/BRs 32(3) and 32(3)') in sub-domain 20(3) compute a path to station 80 based on a path to the access switch 63(1). Again, even though the station 80 is attached to an access switch in mobility sub-domain 20(3), it keeps its IP address 10.1.1.1, which is part of the IP subnet served by the access switch 60(1) in mobility sub-domain 20(1). At 170, the access switch 63(1) sends a Handoff Complete message to the mobility controller to confirm the association of station 80 with the access switch 63(1).

Reference is now made to FIG. 11. After the Association Advertisement message sent at 165 in FIG. 10, the MTE for sub-domain 20(3), e.g., MTE/BR 32(3), is aware of the attachment of station 80 on access switch 63(1) in sub-domain 20(3). In order to obtain all traffic sent to station 80 on its IP address 10.1.1.1, which is part of the subnet served by access switch 60(1) in mobility sub-domain 20(1), at 310 the MTE/BR 32(3) sends a notification via pre-established tunnel 90(1) to MTE/BR 32(1) of sub-domain 20(1). This notification indicates to MTE/BR 32(1) that the station 80 with IP address 10.1.1.1 is in sub-domain 20(3). At 320, MTE/BR 32(1) in sub-domain 20(1) uses the tunnel 90(1) with MTE/BR 32(3) in sub-domain 20(3) to transmit packets to and receive packets from the station 80 that has IP address 10.1.1.1. In other words, traffic is tunneled back and forth between edge forwarder in sub-domain 20(1) and edge forwarder in sub-domain 20(3) so that station 80 maintains all sessions tied to its IP address 10.1.1.1 even though it is no longer physically connected to the access switch 60(1) that serves the IP subnet for that IP address.

Said another way, tunnels are pre-established between tunneling endpoint devices across mobility sub-domains. A tunneling endpoint device in the second mobility sub-domain sends to a tunneling endpoint device that is part of the first mobility sub-domain a notification message to indicate that the station is associated with an access switch in the second mobility sub-domain. Thereafter, the tunneling endpoint device in the first mobility sub-domain exchanges packets using a tunnel with the tunneling endpoint device in the second mobility sub-domain in order to send network traffic targeted to the device and receive network traffic from the device over the tunnel.

The above description is by way of example only.

What is claimed is:

1. A method comprising:
   at a first access switch in a first mobility sub-domain of a network comprising a plurality of mobility sub-domains, each mobility sub-domain comprising one or more access switches each serving one or more Internet Protocol (IP) subnets each comprising a plurality of IP addresses, detecting connection of a wireless device to the first access switch;
   sending an announce message from the first access switch to all other access switches in the first mobility and to a controller apparatus that is configured to control routing for the plurality of mobility sub-domains, wherein the announce message indicates detection of the wireless device by the access switch;

obtaining an IP address for the wireless device according to the one or more IP subnets served by the first access switch;

sending an association advertisement message from the first access switch to other access switches and routers in the first mobility sub-domain, wherein the association advertisement message is configured to indicate the IP address of the wireless device, a sequence number assigned to the first access switch, a virtual local area network (VLAN) identifier, a sub-domain identifier for the sub-domain that the wireless device is currently located in, and the association of the wireless device to the first access switch to enable other access switches and routers in the first mobility sub-domain to compute a path to the wireless device by computing a path to the first access switch;

establishing tunnels between tunneling end point devices in each of the plurality of mobility sub-domains;

at the tunneling endpoint device in a second mobility sub-domain, sending to a tunneling endpoint device that is part of the first mobility sub-domain a notification message to indicate that the wireless device is associated with an access switch in the second mobility sub-domain; and exchanging packets with the tunneling endpoint device in the first mobility sub-domain using a tunnel between the tunneling endpoint device in the second mobility sub-domain and the tunneling endpoint device in the first mobility sub-domain in order to send network traffic targeted to the wireless device and receive network traffic from the wireless device over the tunnel.

2. The method of claim 1, and further comprising storing at the controller apparatus information indicating wireless devices detected in the network and the access switches to which those wireless devices are associated; comparing information about the wireless device contained in the announce message against the stored data to determine whether the wireless device is detected for the first time in the network or whether it has already been detected at another access switch in the network; and sending a message to the first access switch indicating that the wireless device is new to the network upon determining, based on the comparing, that the wireless device is detected for the first time in the network.

3. The method of claim 2, and further comprising receiving at the first access switch from the controller apparatus the message indicating the wireless device is new to the network and wherein obtaining is responsive to receipt of the message indicating that the wireless device is new to the network.

4. The method of claim 1, and further comprising sending from the first access switch a handoff complete message to the controller apparatus, wherein the handoff complete message is configured to indicate the association of the wireless device to the first access switch.

5. The method of claim 1, and further comprising receiving at the first access switch an announce message indicating that the wireless device has roamed and attached to a second access switch in the first mobility sub-domain; and in response to receiving the announce message from the second access switch, sending a handoff notification message to the second access switch, wherein the handoff notification message indicates the IP address of the wireless device.

6. The method of claim 5, and further comprising detecting attachment of the wireless device at the second access switch that is part of the first mobility sub-domain; sending the announce message from the second access switch to other access switches in the first mobility sub-domain and to the controller apparatus; receiving the handoff notification message from the first access switch; sending an association advertisement message from the second access switch to other access switches and routers in the first mobility sub-domain to indicate the attachment and association of the wireless device at the second access switch; and sending a handoff complete message from the second access switch to the controller apparatus to indicate the attachment and association of the wireless device to the second access switch.

7. The method of claim 6, and further comprising at the first access switch sending an association delete message to other access switches and routers in the first mobility sub-domain, wherein the association delete message indicates that the wireless device is no longer associated with the first access switch.

8. The method of claim 1, and further comprising detecting connection of the wireless device at a second access switch that is part of the second mobility sub-domain; sending an announce message from the second access switch to other access switches in the second mobility sub-domain and to the controller apparatus; receiving at the second access switch a message from the controller apparatus indicating the previous access switch that the wireless device was attached to; receiving a handoff notification message from the previous access switch, the handoff notification message indicating the IP address of the wireless device; sending an association advertisement message to access switches and routers in the second mobility sub-domain indicating the IP address of the wireless device and the association of the wireless device to the second access switch to enable access switches and routers in the second mobility sub-domain to compute a path to the wireless device based on a path to the second access switch; and sending from the second access switch a handoff complete message to the controller apparatus.

9. The method of claim 8, and further comprising receiving at the previous access switch the message from the controller apparatus indicating that the wireless device has connected and associated to the second access switch in the second mobility sub-domain; in response to receiving the message from the controller apparatus, sending the handoff notification message to the second access switch; and sending an association delete message from the previous access switch to access switches in the mobility sub-domain of the previous access switch to indicate deletion of the association of the wireless device to the previous access switch.

10. An apparatus comprising:
a network interface unit configured to enable communication over a network comprising a plurality of mobility sub-domains each comprising one or more access switches that serves one or more Internet Protocol (IP) subnets that comprises a plurality of IP addresses;
a switch and router unit configured to switch and forward packets over the network; and
a processor configured to be coupled to the network interface unit and to the switch and router unit, wherein the processor is configured to:
store information indicating the one or more IP subnets that are served by the apparatus;
detect connection of a wireless device;
generate an announce message to be sent to other access switches in a first mobility sub-domain and to a controller apparatus that is configured to control routing for the plurality of mobility sub-domains, wherein the announce message indicates detection of the wireless device;
obtain an IP address for the wireless device according to an IP subnet served by the apparatus;

generate an association advertisement message to be sent to other access switches and routers in the first mobility sub-domain, wherein the association advertisement message is configured to indicate the IP address of the wireless device, a sequence number assigned to the first access switch, a virtual local area network (VLAN) identifier, a sub-domain identifier for the sub-domain that the wireless device is currently located in, and the association of the wireless device to the apparatus to enable other access switches and routers in the first mobility sub-domain to compute a path to the wireless device by computing a path to the apparatus;

establish tunnels between tunneling end point devices in each of the plurality of mobility sub-domains;

cause a notification message to be sent from a tunneling endpoint device in a second mobility sub-domain to a tunneling endpoint device that is part of the first mobility sub-domain, the notification message indicating that the wireless device is associated with an access switch in the second mobility sub-domain; and cause an exchange of packets with the tunneling endpoint device in the first mobility sub-domain using a tunnel between the tunneling endpoint device in the second mobility sub-domain and the tunneling endpoint device in the first mobility sub-domain in order to send network traffic targeted to the wireless device and receive network traffic from the device over the tunnel.

11. The apparatus of claim 10, wherein the processor is further configured to generate the association advertisement message in response to receiving from the controller apparatus a message indicating the wireless device is new to the network, and to generate a handoff complete message to be sent to the controller apparatus after the association advertisement message is sent to indicate the association of the wireless device to the apparatus in the first mobility sub-domain.

12. The apparatus of claim 10, wherein the processor is configured to generate a handoff notification message to be sent to an other access switch apparatus in the first mobility sub-domain in response to receiving an announce message indicating that the wireless device has associated to the other access switch in the first mobility sub-domain, wherein the handoff notification message indicates the IP address of the wireless device.

13. The apparatus of claim 10, wherein the processor is configured to generate a handoff notification message to be sent to the access switch apparatus in the second mobility sub-domain in response to receiving a message from the controller apparatus indicating that the wireless device has associated to the access switch apparatus in the second mobility sub-domain, wherein the handoff notification message indicates the IP address of the wireless device.

14. The apparatus of claim 10, wherein the processor is further configured to:

detect connection to the network of an other wireless device;

generate an announce message to be sent to other access switches in the first mobility sub-domain and to the controller apparatus;

receive a message from the controller apparatus indicating that the other wireless device was previously associated with an access switch in a second mobility sub-domain;

receive a handoff notification message from the access switch in the second mobility sub-domain to which the other wireless device was previously attached, the handoff notification message indicating the IP address of the wireless device;

generate an association advertisement message to be sent to access switches and routers in the first mobility sub-domain, the association advertisement message indicating the IP address of the other wireless device and the association of the other wireless device to the apparatus to enable access switches and routers in the first mobility sub-domain to compute a path to the other wireless device based on a path to the apparatus; and generate a handoff complete message to be sent to the controller apparatus.

15. A system comprising:

a plurality of access switches in each of a plurality of mobility sub-domains of a network, each access switch serving one or more Internet Protocol (IP) subnets comprising a plurality of IP addresses;

a tunneling endpoint device in each of the plurality of mobility sub-domains, wherein tunnels are established between tunneling endpoint devices across mobility sub-domains, wherein the tunneling endpoint device in each mobility sub-domain is notified when a wireless device whose IP address is served by an access switch in a different sub-domain has roamed into its sub-domain has roamed into its sub-domain, and wherein a tunneling endpoint device in a first mobility sub-domain is configured to send to a tunneling endpoint device in a second mobility sub-domain a notification message indicating that the wireless device whose IP address is part of the IP subnet served by an access switch in the first mobility sub-domain has roamed to the second mobility sub-domain and to transmit and receive packets over the tunnel with the tunneling endpoint device in the second mobility sub-domain for traffic associated with an IP session for the wireless device that has roamed to the second mobility sub-domain; and a controller apparatus connected to the plurality of mobility sub-domains and configured to communicate with the access switches in each of the plurality of mobility sub-domains;

wherein at least one of the plurality of access switches is configured to:

send an announce message to all other access switches in its respective mobility sub-domains and to the controller apparatus upon detecting connection of a wireless device;

obtain an IP address for wireless device according to the one or more IP subnets served by the access switch; and send an association advertisement message to other access switches and routers in its respective mobility sub-domain, wherein the association advertisement message is configured to indicate the IP address of the wireless device, a sequence number assigned to the first access switch, a virtual local area network (VLAN) identifier, a sub-domain identifier for the sub-domain that the wireless device is currently located in, and the association of the wireless device thereto to enable other access switches and routers in that mobility sub-domain to compute a path to the wireless device by computing a path to the access switch to which the wireless device is associated.

16. The system of claim 15, wherein the controller apparatus comprises a storage device and is configured to store information indicating wireless devices detected in the network and the access switches to which those wireless devices are associated, and wherein the controller apparatus is configured to compare information about the wireless device contained in the announce message against the stored data to determine whether the wireless device is detected for the first time in the network or whether it has already been detected at another access switch in the network, and to send a message to the access switch where the wireless device is located indicating that the wireless device is new to the network upon determining, based on the comparing, that the wireless device is detected for the first time in the network.

17. A non-transitory computer readable medium encoded with instructions that, when executed by a processor, cause the processor to:
at a first switch in a first mobility sub-domain of a network comprising a plurality of mobility sub-domains, each mobility sub-domain comprising one or more access switches each serving one or more Internet Protocol (IP) subnets each comprising a plurality of IP addresses, detect connection of a wireless device to the first access switch;
generate an announce message to be sent from the first access switch to all other access switches in the first mobility sub-domain and to a controller apparatus that is configured to control routing for the plurality of mobility sub-domains, wherein the announce message indicates detection of the wireless device by the first access switch;
obtain an IP address for the wireless device according to the one or more IP subnets served by the first access switch;
generate an association advertisement message to be sent from the first access switch to other access switches and routers in the first mobility sub-domain, wherein the association advertisement message is configured to indicate the IP address of the wireless device, a sequence number assigned to the first access switch, a virtual local area network (VLAN) identifier, a sub-domain identifier for the sub-domain that the wireless device is currently located in, and the association of the wireless device to the first access switch such that other access switches and routers in the first mobility-domain can compute a path to the wireless device by computing a path to the first access switch;
establish tunnels between tunneling end point in each of the plurality of mobility sub-domains;
at a tunneling endpoint device in the second mobility sub-domain, send to a tunneling endpoint device that is part of the first mobility sub-domain a notification message to indicate that the wireless device is associated with an access point in the second mobility sub-domain; and
exchange packets with the tunneling endpoint device in the first mobility sub-domain using a tunnel between the tunneling endpoint device in the second mobility sub-domain and the tunneling device in the first mobility sub-domain in order to send network traffic targeted to the wireless device and receive network traffic from the device over the tunnel.

18. The non-transitory computer readable medium of claim 17, and further comprising instructions that, when executed by the processor, cause the processor to:
receive at the first access switch an announce message indicating that the wireless device has associated to a second access switch in the first mobility sub-domain; and
in response to receiving the announce message from the second access switch, generate a handoff notification message to be sent to the second access switch, wherein the handoff notification message indicates the IP address of the wireless device.

19. The non-transitory computer readable medium of claim 17, and further comprising instructions that, when executed by the processor, cause the processor to:
detect connection to the network of an other wireless device;
generate an announce message to be sent to other access switches in the first mobility sub-domain and to the controller apparatus;
receive a message from the controller apparatus indicating that the other wireless device was previously associated with an access switch in the second mobility sub-domain;
receive a handoff message from the access switch in the second mobility sub-domain to which the other wireless device was previously attached, the handoff notification message indicating the IP address of the other wireless device;
generate an association advertisement message to be sent to access switches and routers in the first mobility sub-domain, the association advertisement message indicating the IP address of the other wireless device and the association of the other wireless device to the first access switch to enable access switches and routers in the first mobility sub-domain to compute a path to the other wireless device based on a path to the first access switch; and
generate a handoff complete message to be sent to the mobility controller apparatus.

20. The non-transitory computer readable medium of claim 17, and further comprising instructions that, when executed by the processor, cause the processor to:
detect connection of the wireless device at a second access switch that is part of the second mobility sub-domain;
send an announce message from the second access switch to other access switches in the second mobility sub-domain and to the controller apparatus;
receive at the second access switch a message from the controller apparatus indicating the previous access switch that the wireless device was attached to;
receive a handoff notification message from the previous access switch, the handoff notification message indicating the IP address of the wireless device;
send an association advertisement message to access switches and routers in the second mobility sub-domain indicating the IP address of the wireless device and the association of the wireless device to the second access switch to enable access switches and routers in the second mobility sub-domain to compute a path to the wireless device based on a path to the second access switch; and
send from the second access switch a handoff complete message to the controller apparatus.

* * * * *